Patented Mar. 29, 1949

2,465,383

UNITED STATES PATENT OFFICE 2,465,383

PRODUCTION OF STAINLESS STEEL IN AN ARC ELECTRIC FURNACE

Vincent T. Malcolm, Indian Orchard, Mass., assignor to The Chapman Valve Manufacturing Co., Indian Orchard, Mass., a corporation of Massachusetts No Drawing. Application December 23, 1946, Serial No. 717,852

1 Claim. (Cl. 75—12)

This invention relates to improvements in low-carbon austenitic steel.

The principal objects of the invention are directed to improvements in low-carbon austenitic steel castings which by reason of the novel procedure in making the same, result in the production of steels or castings in an arc type electric furnace which are not only superior in all important respects to prior art steels but also are produced more efficiently and economically than has been possible heretofore.

Steels of the type to which the invention relates are low-carbon austenitic steels containing not more than .07% carbon, chrome 10% to 35%, and nickel 7% to 30%. There may be in combination therewith selenium, molybdenum, tungsten, titanium and columbium singly or in combination depending upon the use for which the steel is intended.

Steel of the invention for castings is adapted for general use but is particularly adapted for valves, fittings, and various equipment which is subjected to elevated temperatures and pressures, corrosive gases and acids and other substances and elements of an injurious nature.

When the additional elements mentioned above are used, the steel is adapted for many and various purposes.

In the practice of the invention a basic furnace of the electric arc type is used.

The invention will be described with reference to an original charge of 1300 pounds of scrap having a certain analysis and 1600 pounds of steel scrap having a certain analysis. It is to be understood that this is for purposes of description only as heats of various weights may be employed.

The furnace is charged with the 1300 lbs. of scrap having an analysis preferably of .07% carbon maximum, 8 to 10% nickel, 18 to 22% chromium, .5% to 2% silicon, .20 to 1% manganese, and phosphorus and sulphur each under .05%. To this is added the 1600 lbs. of low-carbon steel scrap of .10% carbon maximum, 250 lbs. of manganese-iron ore and 270 lbs. of nickel.

The charge is melted down under oxidizing conditions preferably using dried pebble lime as the slag-making material. About 150 lbs. of lime is used while the arc length is about 1¼" with the A. C. voltage at about 125 to 150. The lime is placed around the electrodes after they have been lowered to a point near the bottom of the charge.

A carbon analysis is taken when the heat is at an elevated temperature, the electrodes are elevated. The current is cut off and then the slag is removed from the top of the melted charge so that the same is thoroughly clean.

With the melted charge thoroughly clean, lime is applied over the exposed molten metal of sufficient amount to form a definite crust. When this crust is of sufficient strength the heat is charged with about 850 lbs. of ferro-chromium which is preferably of the low-carbon type having carbon not in excess of .10%. The ferro-chromium is placed on the slag and on the banks of the furnace and is kept away from the electrodes so as to not be in contact therewith at any time.

While the lime and ferro-chromium are being put into the furnace the electrodes are elevated with the current cut off and when the ferro-chromium has been placed as described, the electrodes are lowered and current is turned to supply a voltage of from 90 to 110 volts with the distance between the bath and the electrodes between ¾" and to 1". Fluorspar should be added under the electrodes before the current is turned on so that the slag is thinned out.

When a good arc is established and the electrodes have quieted down the temperature is raised to approximately 2800° F. at which point ferro-silicon is added in shots at about five minute intervals and is well distributed about the furnace.

The ferro-silicon is preferably of the finely crushed type and contains about 85% silicon. The total amount used may be 30 to 50 lbs., each shot including about 10 lbs. but more silicon than the amount stated may be used providing the molten bath will stand it.

Should the slag become too crusty at this point, a small amount of fluorspar may be used to thin it out, and lime may be used during this period if desired or necessary in order to maintain the slag balance.

As soon as the ferro-chromium has melted, the bath should be checked for temperature and if the silicon is found to be low, this constituent may be added with lime which is used for the finishing slag. When the finishing slag is shaped up or in condition the various final tests are taken. During the finishing period or after the addition of the ferro-chromium it is important that the furnace doors be kept open until the heat is tapped.

The approximate amount of fine ferro-silicon in the above example will preferably be about 50 lbs.

Low-carbon 80% ferro-manganese may be added to bring the manganese content to the point desired. Tests will be continually made to determine the extent of deoxidation and when the metal in the test mold lays quiet and is without appreciable turbulence the heat is ready for tapping.

When the heat is ready it is poured into a ladle where about 4 lbs. of calcium-silicon is added to facilitate more complete deoxidation. It has been found that the approximate time for making a heat according to the invention is approximately two hours and that the electrical consumption is about 750 k. w. h. per net ton of casting steel.

The analysis of a heat made in accordance with the foregoing is as follows:

|  | Percent |
|---|---|
| Carbon | .05 |
| Manganese | .72 |
| Silicon | 1.39 |
| Phosphorus | .021 |
| Sulphur | .007 |
| Nickel | 9.77 |
| Chromium | 21.61 |

Balance substantially iron.

Where it is desired to incorporate other elements the above general procedure is followed, except that molybdenum, or columbium are added to the initial charge at the beginning of the heat. Titanium is added after the first slag removal, tungsten is added just prior to tapping, while selenium is added in the ladle after tapping. The added constitutents are preferably in the form of ferro alloys.

What it is desired to claim and secure by Letters Patent of the United States is:

In a method of making casting steel the steps, of charging an electric arc furnace with 1300 pounds of steel scrap having an analysis of a maximum of 0.07% carbon and a maximum of 10% nickel and a maximum of 22% chromium and a maximum of 2% silicon and a maximum of 1% manganese and a maximum of 0.05% phosphorous and a maximum of 0.05% sulphur and with 1600 pounds of steel scrap having an analysis of no more than 0.10% carbon and with 250 pounds of manganese iron ore and with 270 pounds of nickel, of a melting down of the charge with 150 pounds of dry pebble lime added thereto as a slag-making material and placed around the electrodes after lowering thereof to a point near the bottom of the charge, of elevating the electrodes and turning the current off, of removing the slag to clean the molten metal, of adding lime to form a crust over the molten metal, of placing 850 pounds of ferro-chromium having an analysis of no more than 0.10% carbon upon the slag crust, of adding fluorspar under the electrodes, of lowering the electrodes and turning the current on, of adding no more than fifty pounds of ferro-silicon, of adding a quantity of lime for the finishing slag, of tapping the furnace and pouring the metal into a ladle, and of adding 4 pounds of calcium silicon to the metal in the ladle.

VINCENT T. MALCOLM.

REFERENCES CITED

The following references are of record in the file of this patent:

UNITED STATES PATENTS

| Number | Name | Date |
|---|---|---|
| 1,335,009 | Moore | Mar. 30, 1920 |
| 1,710,446 | Browne | Apr. 23, 1929 |
| 1,844,598 | Read | Feb. 9, 1932 |
| 1,954,555 | Arness | Apr. 10, 1934 |
| 1,994,679 | Arness | Mar. 19, 1935 |
| 2,001,016 | Feild | May 14, 1935 |
| 2,096,318 | Browne | Oct. 19, 1937 |